(12) United States Patent
Yamazaki et al.

(10) Patent No.: US 7,323,656 B2
(45) Date of Patent: Jan. 29, 2008

(54) SEAL DEVICE OF LIGHT PATH SYSTEM IN LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi pref (JP)

( * ) Notice: Subject to any disclaimer, the term of this patent is extended or adjusted under 35 U.S.C. 154(b) by 0 days.

(21) Appl. No.: 11/538,837

(22) Filed: Oct. 5, 2006

(65) Prior Publication Data

US 2007/0090101 A1    Apr. 26, 2007

(30) Foreign Application Priority Data

Oct. 26, 2005   (JP)   ............... 2005-310705

(51) Int. Cl.
  *B23K 26/00*  (2006.01)
  *B23K 26/08*  (2006.01)
(52) U.S. Cl. .............. 219/121.6; 219/121.78; 219/121.86
(58) Field of Classification Search ............. 219/121.6, 219/121.67, 121.78, 121.86
See application file for complete search history.

(56) References Cited

U.S. PATENT DOCUMENTS

| | | | |
|---|---|---|---|
| 4,491,717 A * | 1/1985 | Geffroy et al. | 219/121.67 |
| 5,442,154 A * | 8/1995 | Philippe et al. | 219/121.62 |
| 5,472,367 A | 12/1995 | Slocum et al. | |
| 5,763,855 A * | 6/1998 | Shioji | 219/121.6 |
| 6,310,317 B1 * | 10/2001 | Remue | 219/121.67 |
| 2005/0178753 A1 * | 8/2005 | Yamazaki et al. | 219/121.78 |

FOREIGN PATENT DOCUMENTS

| | | |
|---|---|---|
| EP | 1 566 235 | 8/2005 |
| JP | 2-030393 A * | 1/1990 |
| JP | 11-000778 A * | 1/1999 |
| JP | 2005-297029 | 10/2005 |
| WO | 01/32350 | 5/2001 |

OTHER PUBLICATIONS

European Search Report for corresponding Application No. 06 40 5405 dated Mar. 20, 2007.

* cited by examiner

*Primary Examiner*—Geoffrey S. Evans
(74) *Attorney, Agent, or Firm*—Renner, Otto, Boisselle & Sklar, LLP

(57) ABSTRACT

The invention provides a laser beam machine having a light path duct with improved dust proof property. A light path system of a laser beam machine comprises a light path duct 10 having a U-shaped cross-section with the upper end opened, and a light path 12 into which clean air is fed. Gutters 110 are disposed on both sides of the light path duct 10, and liquid 120 is filled therein. The laser beam extraction unit 50 traveling on the light path duct 10 has panels 150 disposed on both sides thereof, and a skirt portion 152 formed at the end of each panel 150 is immersed in the liquid 120, thereby forming a liquid seal.

4 Claims, 3 Drawing Sheets

SEAL DEVICE OF LIGHT PATH SYSTEM IN LASER BEAM MACHINE

The present application is based on and claims priority of Japanese patent application No. 2005-310705 filed on Oct. 26, 2005, the entire contents of which are hereby incorporated by reference.

BACKGROUND OF THE INVENTION

1. Field of the Invention

The present invention relates to a seal device of a light path system disposed in a laser beam machine and the like.

2. Description of the Related Art

A laser beam machine includes a laser beam path system for supplying laser beam output from a fixed laser oscillator to a machining head moving at high speed.

The laser beam machine for realizing the present invention is equipped with a bed for housing pallets on which workpieces are placed, a column guided via guide rails disposed on both sides of the bed and moving at high speed along the longitudinal direction of the bed, and a machining head moving at high speed on guide rails disposed on the column in the direction orthogonal to the direction of movement of the column.

The laser beam path system disposed on the laser beam machine comprises a light path duct disposed along the longitudinal direction of the bed, and a laser beam extraction unit that moves in synchronization with the column for extracting the laser beam passing through the light path duct and sending the same toward the column.

The light path duct is a member having a U-shaped cross-section with the upper portion opened into which clean air is supplied, and in the interior thereof is irradiated a laser beam. A dust proof mechanism is adopted, in which the upper surface of the light path duct is covered by a steel belt, and the steel belt is elevated via a guide roller only where the laser beam extraction unit passes, so as to enable the laser beam to be extracted.

Japanese patent application No. 2004-118483 discloses a dust proof unit of a laser beam machine filed by the present applicant.

In the dust proof unit of a laser beam machine disclosed in the above-mentioned patent application, a belt-like magnet is disposed on both sides of the light path duct into which clean air is fed, attracting the steel belt and preventing foreign substances from entering the duct.

However, foreign substances may enter the light path duct from both sides of the duct when the laser beam extraction unit passes.

SUMMARY OF THE INVENTION

The object of the present invention is to provide a seal device of a laser beam machine that solves the problems of the prior art mentioned above.

In order to achieve the above object, the present invention provides a seal device of a light path system provided in a laser beam machine having a light path duct with an upper portion opened through which laser beam passes, a belt covering the opening of the light path duct, and a laser beam extraction unit traveling along the light path duct for extracting the laser beam; the seal device comprising gutters disposed on both sides of the opening of the light path duct, a liquid filled in the gutters, panels disposed on both sides of the laser beam extraction unit, and a skirt portion formed at each end portion of the panel and immersed in the liquid filled in the gutter.

Further, the liquid filled in the gutters is nonvolatile liquid.

The seal device further comprises a steel belt covering the light path duct, and a magnetic belt member for attracting both side portions of the steel belt disposed on the upper surface of the light path duct.

Moreover, the laser beam extraction unit comprises a guide roller for pressing the belt onto the light path duct, a straight roller disposed on the lower side of the belt and guiding the belt to an elevated position, and a guide roller disposed on the upper side of the belt and sandwiching the belt with the straight roller.

As described, the present invention utilizes a seal device providing a liquid seal for the light path duct on which the laser beam extraction unit travels at high speed, so that foreign substances are prevented without fail from entering the light path duct into which clean air is supplied.

DETAILED DESCRIPTION OF THE PREFERRED EMBODIMENTS

Figure 1:
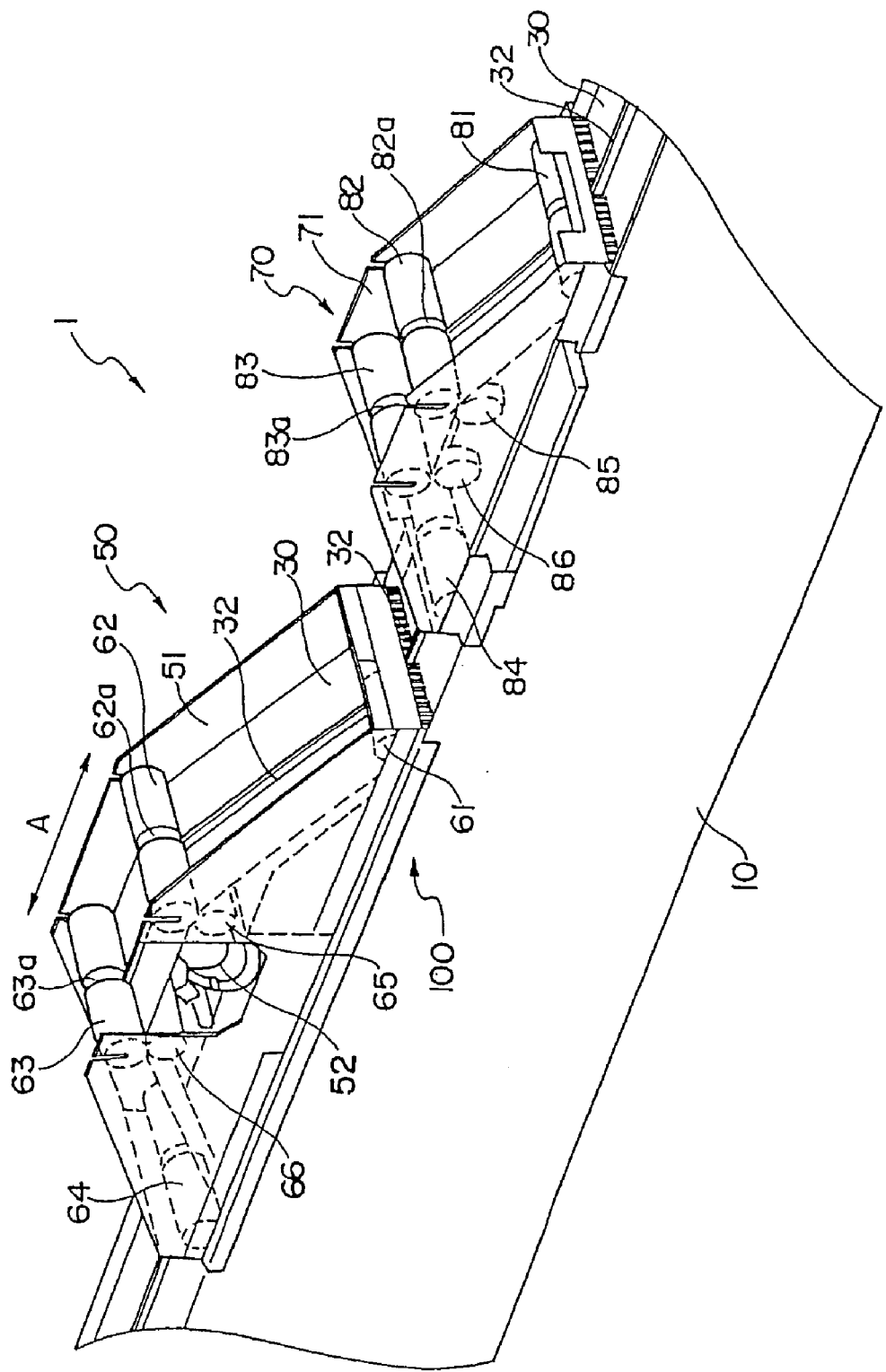
FIG. 1 is a perspective view showing the relevant portion of a light path system of the laser beam machine.
Figure 2:
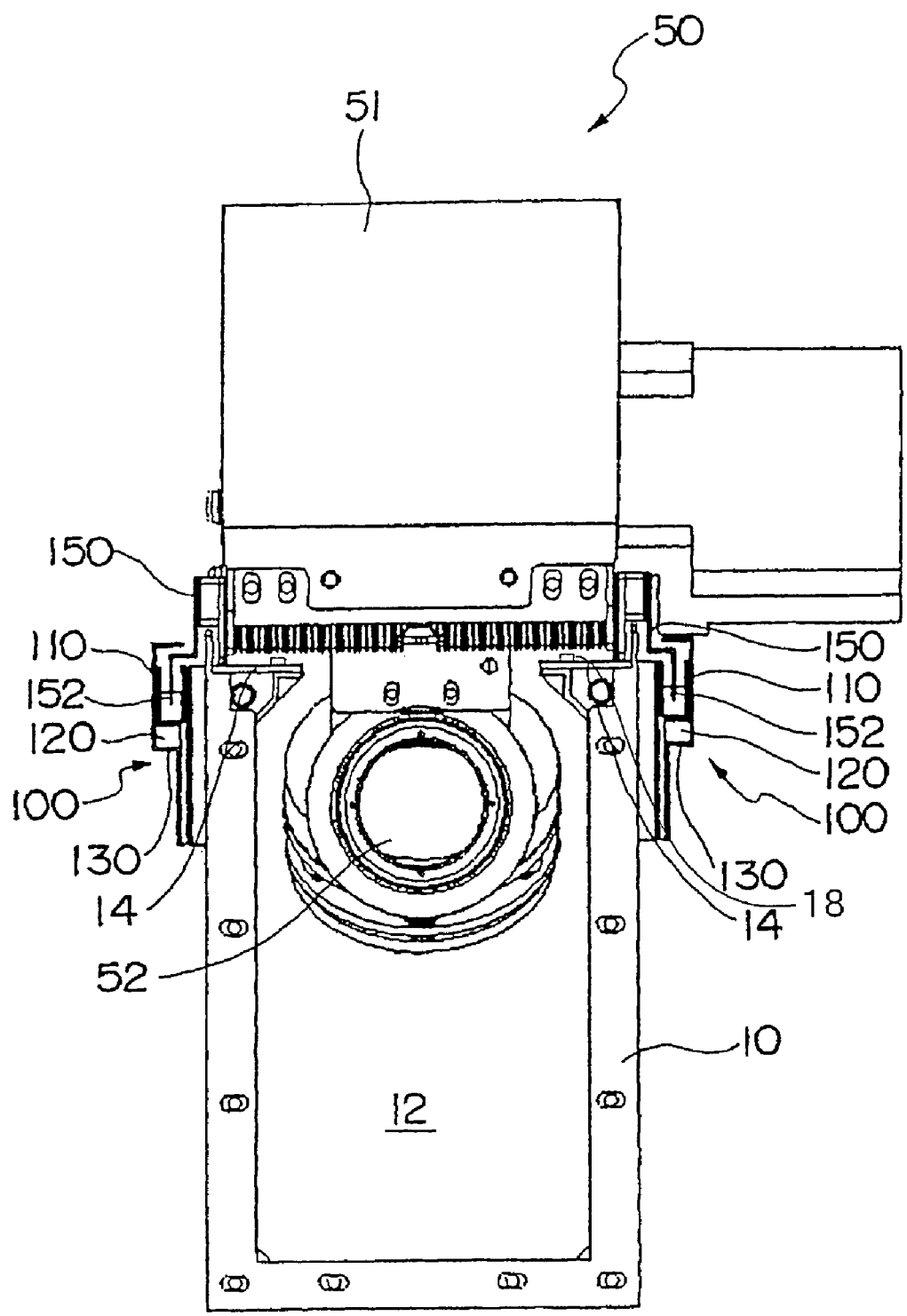
FIG. 2 is a cross-sectional view of a light path duct.
Figure 3:
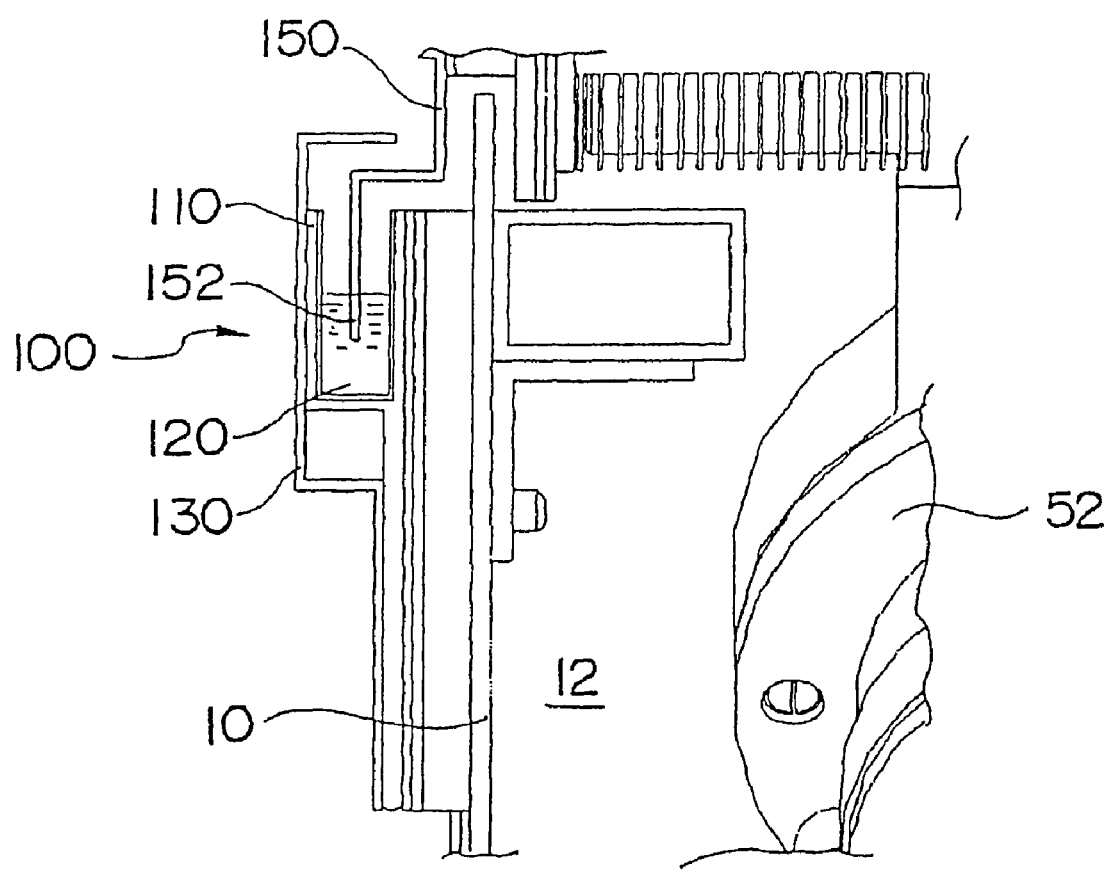
FIG. 3 is an enlarged view of the relevant portion of FIG. 2.

FIG. 1 is a perspective view showing the relevant portion of a light path system of the laser beam machine according to the present invention, and FIG. 2 is a cross-sectional view of the light path duct.

The light path system of a laser beam machine shown as a whole by reference number 1 has a light path duct 10, and a laser beam extraction unit 50 that moves at high speed on the light path duct in the direction of arrow A. Necessary devices such as a mirror 52 and the like are disposed on the laser beam extraction unit 50.

A laser beam path length compensation unit 70 running on the same axis as the laser beam extraction unit 50 has a function to compensate the light path length varied by the laser beam extraction unit 50 traveling on the duct with respect to a fixed laser beam source.

As shown in FIG. 2, the light path duct 10 has a substantially U-shaped cross-sectional shape, forming therein a space 12 through which laser beams passes. The upper portion of the light path duct 10 is opened, with flanges 14 formed on both inner sides of the upper end thereof. On the upper surface of the flange 14 is disposed a magnetic rubber belt 18 formed for example by impregnating rubber with magnetic powder material.

The magnetic rubber belt 18 attracts the lower surface on both side ends of a steel belt 30 covering the upper opening of the light path duct 10, preventing foreign substances from entering the light path duct 10.

A guiding projection 32 is disposed on the center portion of the upper surface of the steel belt 30. This projection 32 is formed for example by forming a belt-like body from rubber material and bonding the same via an adhesive or the like on the upper surface of the steel belt 30.

The laser beam extraction unit 50 has six guide rollers mounted to a frame 51. Four guide rollers 61, 62, 63 and 64 disposed on the upper side of the steel belt 30 has V-shaped grooves 61a, 62a, 63a and 64a formed respectively on the center thereof.

The grooves on the guide rollers engage the projection 32 on the steel belt 30, and restrict the lateral movement of the steel belt 30. Guide rollers 62 and 63 form a space for extracting the laser beam in the upper direction from the light path duct 10 by elevating the steel belt 30. In order to realize this arrangement, straight rollers 65 and 66 for sandwiching and guiding the steel belt together with the guide roller 62 are disposed on the lower side of the steel belt 30 under the guide roller 62. Since the straight roller 65 contacts the lower surface of the steel belt having no projection, a cylindrical straight roller is used.

The laser beam path compensation unit 70 is also equipped with similar groups of rollers.

FIG. 2 shows a cross-section of the light path duct 10.

The laser beam extraction unit 50 includes a laser beam extraction mirror 52 and so on, and runs at high speed on the light path duct 10. Flanges 14 are disposed on the upper ends of the opening of the light path duct 10, and the steel belt not shown covering the opening of the light path duct 10 is elevated along with the traveling motion of the laser beam extraction unit 50.

Clean air is constantly fed into the light path 12 of the light path duct 10 for cooling and preventing dust from entering the light path 12.

The laser beam extraction unit 50 travels on the light path duct 10 at high speed, so seal structures are required at both sides on the upper end of the light path duct 10.

The seal device denoted as a whole by reference number 100 has U-shaped gutters 110 disposed along the outer side of the side wall of the light path duct 10. A liquid 120 is filled in the gutters 110. It is preferable that the liquid is a nonvolatile liquid.

If necessary, a cover 130 is disposed on each of the outer sides of the gutters 110, forming a labyrinth with a panel 150 described later.

The laser beam extraction device 50 has panels 150 fixed to both sides of the frame 51. Each panel 150 is bent so as to form a labyrinth with the cover 130 and a skirt portion 152 disposed at the end of the panel 150 is immersed in the liquid 120 filled in the gutter 110.

The seal device 100 having the above-mentioned arrangement enables to completely seal the area between both sides of the laser beam extraction unit and the inner side of the light path duct 10 via a liquid seal mechanism.

What is claimed is:

1. A seal device of a light path system provided in a laser beam machine having a light path duct with an upper portion opened through which laser beam passes, a belt covering the opening of the light path duct, and a laser beam extraction unit traveling along the light path duct for extracting the laser beam; the seal device comprising:

gutters disposed on both sides of the opening of the light path duct;

a liquid filled in the gutters;

panels disposed on both sides of the laser beam extraction unit; and a skirt portion formed at each end portion of the panel and immersed in the liquid filled in the gutter.

2. The seal device of a light path system provided in a laser beam machine according to claim 1, wherein the liquid filled in the gutters is nonvolatile liquid.

3. The seal device of a light path system provided in a laser beam machine according to claim 1, further comprising a steel belt covering the light path duct, and a magnetic belt member for attracting both side portions of the steel belt disposed on the upper surface of the light path duct.

4. The seal device of a light path system provided in a laser beam machine according to claim 1, wherein the laser beam extraction unit comprises a guide roller for pressing the belt onto the light path duct, a straight roller disposed on the lower side of the belt and guiding the belt to an elevated position, and a guide roller disposed on the upper side of the belt and sandwiching the belt with the straight roller.

* * * * *